United States Patent
Daigle et al.

(10) Patent No.: US 10,825,120 B2
(45) Date of Patent: Nov. 3, 2020

(54) SYSTEMS AND METHODS FOR QUALITY MONITORING OF ASSETS

(71) Applicant: BXB Digital Pty Limited, Sydney (AU)

(72) Inventors: Ryan Daigle, Fremont, CA (US); Rajashree Valame, Palo Alto, CA (US)

(73) Assignee: BXB DIGITAL PTY LIMITED, Sydney (AU)

( * ) Notice: Subject to any disclaimer, the term of this patent is extended or adjusted under 35 U.S.C. 154(b) by 33 days.

(21) Appl. No.: 15/987,537

(22) Filed: May 23, 2018

(65) Prior Publication Data

US 2018/0342032 A1 Nov. 29, 2018

Related U.S. Application Data

(60) Provisional application No. 62/510,181, filed on May 23, 2017.

(51) Int. Cl.
| | | |
|---|---|---|
| *G06Q 50/28* | (2012.01) | |
| *G06Q 10/06* | (2012.01) | |
| *G06Q 10/08* | (2012.01) | |
| *G06Q 50/30* | (2012.01) | |

(52) U.S. Cl.
CPC ....... *G06Q 50/28* (2013.01); *G06Q 10/06395* (2013.01); *G06Q 10/0833* (2013.01); *G06Q 10/0832* (2013.01); *G06Q 50/30* (2013.01)

(58) Field of Classification Search
CPC .. G06Q 50/28; G06Q 50/30; G06Q 10/06395; G06Q 10/0833; G06Q 10/0832
USPC ....................................................... 705/7.41
See application file for complete search history.

(56) References Cited

U.S. PATENT DOCUMENTS

| | | |
|---|---|---|
| 5,774,876 A | 6/1998 | Woolley et al. |
| 6,199,488 B1 | 3/2001 | Favaron et al. |
| 6,294,114 B1 | 9/2001 | Muirhead |
| 6,483,434 B1 | 11/2002 | Umiker |
| 6,661,339 B2 | 12/2003 | Muirhead |

(Continued)

FOREIGN PATENT DOCUMENTS

WO 2008038017 4/2008

OTHER PUBLICATIONS

Intermec's Intellitag RFID Technology Enables CHEP's. Global Pallet Tracking Business Wire Nov. 13, 2001: 0480.*

(Continued)

*Primary Examiner* — Timothy Padot
(74) *Attorney, Agent, or Firm* — Kilpatrick Townsend & Stockton LLP (57) ABSTRACT

Embodiments of the present invention address the above problems and others, while providing for a number of advantages. Some embodiments provide for end to end tracking that is able to provide ubiquitous sensor information and coverage by pairing the sensor data collection (either via BLE, barcodes, or QR codes paired with a mobile app or smart device) with the assets to collect data from farm to fork (i.e., end to end). This is in contrast to traditional solutions that may only be able to track certain data for a single leg or trip in the supply chain. Some embodiments allow more devices to be paired with products within a truckload or warehouse, since the devices are already embedded with the asset. Thus, customers may evaluate environmental differences that affect product quality.

20 Claims, 8 Drawing Sheets

(56) References Cited

U.S. PATENT DOCUMENTS

| | | | |
|---|---|---|---|
| 6,669,089 B2 | 12/2003 | Cybulski et al. | |
| 6,718,888 B2 | 4/2004 | Muirhead et al. | |
| 6,749,418 B2 | 6/2004 | Muirhead | |
| 6,814,287 B1 | 11/2004 | Chang et al. | |
| 6,943,678 B2 | 9/2005 | Muirhead | |
| 7,342,496 B2 | 3/2008 | Muirhead | |
| 7,735,430 B2 | 6/2010 | Muirhead | |
| 7,752,980 B2 | 7/2010 | Muirhead | |
| 7,789,024 B2 | 9/2010 | Muirhead | |
| 7,804,400 B2 | 9/2010 | Muirhead | |
| 7,874,256 B2 | 1/2011 | Muirhead | |
| 7,948,371 B2 | 5/2011 | Muirhead | |
| 7,963,235 B2 | 6/2011 | Muirhead | |
| 8,077,040 B2 | 12/2011 | Muirhead | |
| 8,210,107 B2 | 7/2012 | Muirhead | |
| 8,313,594 B2 | 11/2012 | Muirhead | |
| 8,331,862 B2 | 12/2012 | Twitchell, Jr. | |
| 8,347,794 B2 | 1/2013 | Muirhead | |
| 8,585,850 B2 | 11/2013 | Muirhead | |
| 8,830,072 B2 | 9/2014 | Batra et al. | |
| 9,230,227 B2 | 1/2016 | Muirhead | |
| 9,613,239 B2 | 4/2017 | Lee et al. | |
| 9,679,237 B2 | 6/2017 | Linkesch et al. | |
| 9,813,850 B2 | 11/2017 | Lee et al. | |
| 9,947,196 B2 | 4/2018 | Lee et al. | |
| 10,339,619 B2 | 7/2019 | Muirhead | |
| 2003/0170357 A1* | 9/2003 | Garwood | B65D 81/268 426/392 |
| 2005/0046567 A1* | 3/2005 | Mortenson | G08B 21/18 340/539.13 |
| 2007/0095905 A1* | 5/2007 | Kadaba | G07C 5/085 235/384 |
| 2010/0299278 A1* | 11/2010 | Kriss | G06Q 10/0833 705/332 |
| 2010/0332407 A1* | 12/2010 | Grieve | G06Q 10/0832 705/332 |
| 2011/0040440 A1* | 2/2011 | de Oliveira | G06Q 10/0631 701/29.5 |
| 2011/0169636 A1 | 7/2011 | Kadaba | |
| 2012/0252501 A1 | 10/2012 | Smith et al. | |
| 2014/0049392 A1 | 2/2014 | Wagner | |
| 2014/0222711 A1* | 8/2014 | Tibbs | G06Q 10/0833 705/337 |
| 2014/0289020 A1* | 9/2014 | Schullian | G01N 33/00 705/7.35 |
| 2015/0039529 A1* | 2/2015 | Barakat | G01K 7/42 705/332 |
| 2015/0120597 A1* | 4/2015 | Dertadian | G01K 3/04 705/332 |
| 2017/0323412 A1 | 11/2017 | Muirhead | |
| 2020/0019927 A1 | 1/2020 | Muirhead | |

OTHER PUBLICATIONS

Pallet tracking leads RFID applications. (News Briefs). Knill, Bernie. Material Handling Management 57.1: 8(2). Penton Media, Inc., Penton Business Media, Inc. and their subsidiaries. (Jan. 2002).*

Pallet monitoring system based on a heterogeneous sensor network for transparent warehouse processes. Borstell, Hagen; Kluth, Jewgeni; Jaeschke, Marcel; Plate, Cathrin; Gebert, Bernd; et al. 2014 Sensor Data Fusion: Trends, Solutions, Applications (SDF): 6.;128. IEEE. (2014).*

International Application No. PCT/US2018/034083 ,"International Search Report and Written Opinion" dated Oct. 24, 2018, 11 pages.

GoTo Pallets inc. "The future of the pallet pooling industry begins with the G2 Pallet." Retrieved capture from http://gotopallets.com for the date of Oct. 1, 2016, 77 pages.

Roussel, J., "Making the Supply Chain Everyone's Business," May 9, 2014, 8 pages.

"Recommendations on the Grocery Industry Pallet System," written for the The Grocery Industry Pallet Subcommittee by Cleveland Consulting Associates, Jan 1, 1992, 16 pages.

GoTo Pallets Marketing Brochure dated Oct. 12, 2016. Retrieved from http://gotopallets.com 8 pages.

* cited by examiner

SYSTEMS AND METHODS FOR QUALITY MONITORING OF ASSETS

CROSS-REFERENCES TO RELATED APPLICATIONS

This application claims the benefit of U.S. Provisional Patent Application No. 62/510,181, filed May 23, 2017, which is herein incorporated by reference in its entirety.

FIELD

The present disclosure generally relates to product movement utilizing conveyance platforms, and more specifically to systems and methods for quality monitoring of assets.

BACKGROUND

Monitoring movement and environmental conditions of product conveyance platforms through a supply and distribution chain can aid in diagnosing issues with loss and recovery, damage and cycle time. Reducing loss, damage and cycle time may have a material economic benefit for entities across the supply chain. Tracking product conveyance platforms through the supply chain may also facilitate tracking of the products they carry whenever an association between the two may be captured.

It may also be important to track the quality of products in movement and at rest to ensure that certain established standards are met. Existing quality monitoring techniques may not give context to the monitored quality criteria. For example, quality criteria may not meet standards due to a shortage of carrier capacity. However, these two issues may never be associated with each other to allow a remedy to be found. In addition, without context to the quality criteria, product waste may result, such as food waste or waste of other perishable items.

BRIEF SUMMARY

A key problem with product quality monitoring in today's environment is the feasibility of end-to-end tracking in the supply chain, differences in geo-environmental readings within a supply chain, lack of integration with existing systems and processes, and reactive decision making criteria for most customers. Some embodiments of the invention provide an integrated solution that uses a device with one or more sensors embedded within. The device is associated with (e.g., affixed to) a product conveyance platform (e.g., an RPC, a pallet, a container, etc.) and can be placed on multiple products within a shipment.

Embodiments of the present invention address the above problems and others, while providing for a number of advantages. Some embodiments provide for end to end tracking that is able to provide ubiquitous sensor information and coverage by pairing the sensor data collection (either via BLE paired with a mobile app or cellular type device) with the assets to collect data from farm to fork (i.e., end to end). This is in contrast to traditional solutions that may only be able to track certain data for a single leg or trip in the supply chain. Some embodiments allow more devices to be paired with products within a truckload or warehouse, since the devices are already embedded with the asset. Thus, customers may evaluate environmental differences that affect product quality.

Some embodiments address a key issue with existing solutions: lack of integration with customer systems. Thus, embodiments may react correctly to dynamic changes in product quality. Some embodiments may integrate both existing label information (e.g., UPC and PTI labels) and sensor information in order to ensure that accurate product decisions are made to maximize freshness and throughput. This may be reactive or real-time, and may allow for predictive decision making. Some embodiments may pair existing system information (e.g., UPC and PTI label information) to predict the shelf life of customer products that can be integrated with existing solutions to price product accordingly or to change supply chain behaviors (e.g., rerouting trucks to maximize throughput). Product shelf life can be predicted using known information about product types and pairing it with key geo-environmental data such as time, temperature, impacts, vibration, light and humidity.

Data may be collated to identify common attributes which are associated with issues occurring in some embodiments. For example, embodiments may be used to determine whether temperature thresholds are breached whenever a certain type of packaging or packing method is used. In another example, embodiments may be used to see whether there is impact damage when a particular carrier, transport method, or time of day is seen.

In addition, in some embodiments, quality monitoring data may be married with supply chain events. According to some embodiments, a product conveyance platform may be tracked through the supply chain. This data may be layered and associated with the quality monitoring data in order to draw inferences or conclusions about the product conveyance platform. For example, supply chain data supplied, e.g., by a beacon on a product conveyance platform, may be used to know where a product conveyance platform is located, what facility the product conveyance platform is at, etc. Once this supply chain data is known, it can be automatically paired with time stamped quality monitoring data. This may provide insight into various conditions, handling issues, and quality issues at various locations along the supply chain.

This combination of end-to-end service and the level at which measurements are performed may be important. A truckload may go from a first location to a second location, and at the second location, part of the load may travel to a third location and part of the load may travel to a fourth location. By association at a level of handling unit lower than the truckload, the complexities of associating the data from the different legs for different loads is avoided.

Thus, embodiments of the invention may help prevent food waste and product rejection from occurring. This may be accomplished by improved supply chain efficiencies (e.g., route optimization), improved inventory management (e.g., FIFO), and increased product throughput at retail (e.g., cost optimization) based on predicted shelf life or product state. Quality monitoring information may be provided from the point of creation (e.g., manufacturer) or picking (e.g., grower), all the way to the end consumer at retail.

Provided are methods, including computer-implemented methods, devices, and computer-program products applying systems and methods for quality monitoring of assets. According to some embodiments of the invention, a computer-implemented method is provided. The method comprises tracking, by a server computer, a platform traveling along a route to a destination, wherein the platform is associated with an asset. In some embodiments, the asset may be a product. The method further comprises receiving quality monitoring data collected by at least one sensor affixed to the platform. The method further comprises identifying a data point within the quality monitoring data that exceeds a threshold, wherein the threshold is specific to the asset. The method further comprises selecting a new destination based on the asset and the data point. The method further comprises rerouting the platform to the new destination. In some embodiments, the method comprises taking some other action based on the threshold being exceeded.

According to some embodiments of the invention, a server computer is provided. The server computer comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

Figure 1A:
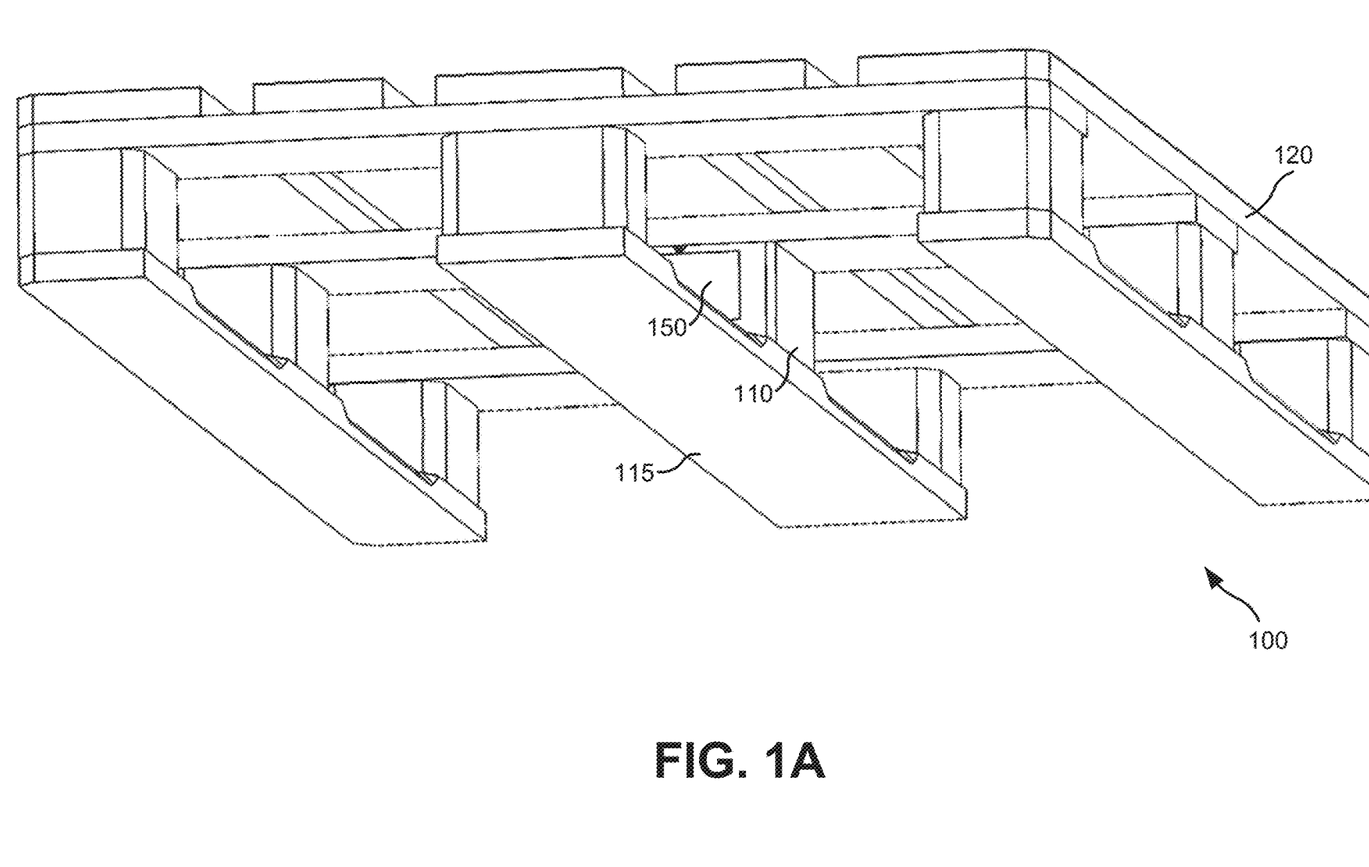
FIG. 1A is a bottom perspective view of a pallet with a beacon, in accordance with some embodiments.

A pallet may be a structure that supports physical assets for storage, presentation, handling, and/or transportation. As used herein, the term "pallet" may be used to describe any load carrier and/or product conveyance platform, including any type of RPC, platform, dolly, bin, container, and the like, all of which may be used interchangeably herein. The physical assets may be any physical assets, such as perishable or nonperishable physical goods. FIG. 1A is a bottom perspective view of a pallet 100, in accordance with some embodiments. The pallet 100 may include a base 120 and legs 110. The pallet 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the pallet 100. Although shown as having a particular design in FIG. 1A, it is contemplated that any design may be incorporated on or in the base 120. For example, the base 120 may have smaller, larger, fewer, more, differently shaped, or differently placed spacings than those shown in FIG. 1A, depending on characteristics of the particular physical asset to be placed on the base 120 (e.g., weight, shape, temperature requirements, size, etc.). As used herein, the term "legs" may be used interchangeably with the term "blocks".

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having three legs 110, it is contemplated that the pallet 100 may have any suitable number of legs or no legs. For example, in some embodiments, the pallet 100 may include a base 120 on both the top and bottom of the pallet 100 with no legs. In another example, for heavier physical assets, the pallet 100 may include one or more additional legs centrally located with respect to the pallet 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. In some embodiments, the pallet 100 may be constructed to include unique physical features. In some embodiments, the base 120 may be made of a same or different material than the legs 110. In some embodiments, the base 120 and the leas 110 may form a single unitary body (e.g., formed from a single mold). In some embodiments, the base 120 may be removable from one or more of the legs 110.

In some embodiments, additional components may be integrated with the pallet 100. For example, the underside of the pallet 100 may include a beacon 150. The beacon 150 may include any electronic device capable of handling or storing data. The beacon 150 may include a number of different functionalities. For example, the beacon 150 may be programmed with the type of physical asset located on the pallet 100 and/or an identifier of the pallet 100. This two stage association may be important for practical and operational reasons. The beacon 150 (or similar device) may be associated with the pallet 100 and the pallet 100 may be associated with the product unit load. This is practical because, under load, the beacon 150 may be unlikely to be visible and difficult to discover electronically as there may be many such instrumented pallets in the vicinity. This is operationally important because this allows the pallet 100 to be tracked after the association to the product has ended, such that reverse logistics can be monitored after change in chain of custody. The beacon 150 may further include or be in operable communication with one or more sensors configured to monitor certain conditions of the pallet 100 (e.g., environmental conditions, movements, etc.). The beacon 150 may be capable of communication with other devices, such as other beacons, devices, and/or servers. The beacon 150 is described further herein with respect to FIGS. 4 and 5. Although shown as being located in a particular position on the pallet 100, it is contemplated that the beacon 150 may be located in any suitable position on the pallet 100.

Figure 1B:
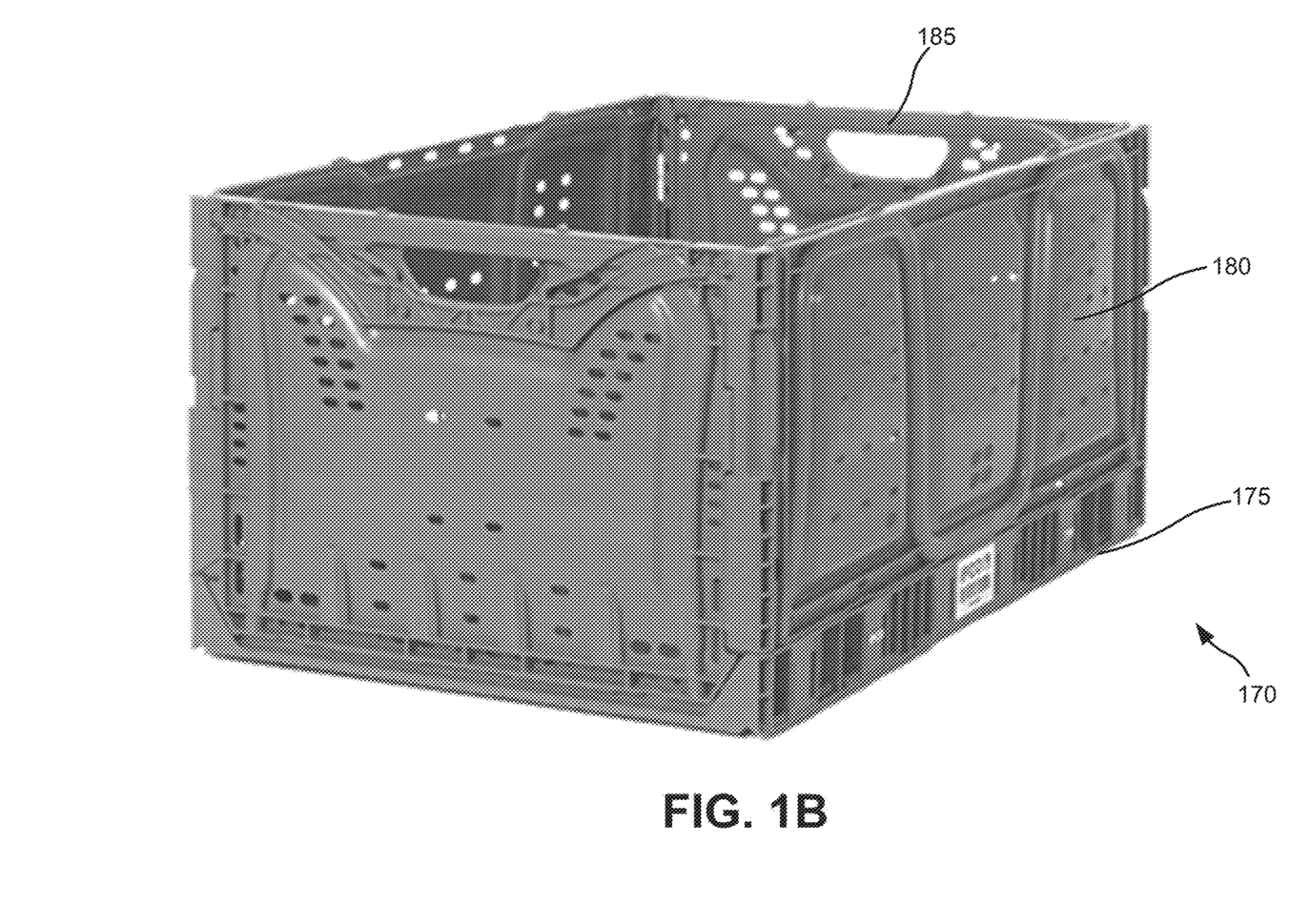
FIG. 1B is a front perspective view of a reusable plastic container (RPC), in accordance with some embodiments.

FIG. 1B is a front perspective view of a reusable plastic container (RPC) 170, in accordance with some embodiments. An RPC 170 may be an example of a pallet, platform, and/or container, as used herein. An RPC 170 may be any reusable plastic structure that supports physical assets. The RPC 170 may include a bottom 175 (also referred to herein as a "base") and sides 180. The RPC 170 may be of any size, shape, and/or dimension, and does not necessarily have to be rectangular, as shown in FIG. 1B. Further, although described herein as being constructed of plastic, it is contemplated that a similar reusable container to that shown in FIG. 1B may be made of any material or combination of materials. In some embodiments, the RPC 170 may be impervious to moisture. The bottom 175 and sides 180 may be of any size, shape, texture, and/or dimensions. In some embodiments, the RPC 170 does not include a top opposing the bottom 175, to allow the RPC 170 to be stacked with additional RPCs, to allow a physical asset being transported therein to protrude from the RPC 170, etc. The bottom 175 may be flat and/or otherwise configured to support the shape and/or weight of the physical asset to be contained in the RPC 170. In some embodiments, the bottom 175 and the sides 180 may form a single unitary body (e.g., formed from a single mold).

In some embodiments, one or more of the sides 180 may include a handle 185 to facilitate movement, handling, assembly, disassembly, and/or transportation of the RPC 170. One or more of the sides 180 and/or the bottom 175 may include holes configured for ventilation. By ensuring that the physical asset remains ventilated, a proper temperature may be maintained within the RPC 170. Although shown as having four sides 180, it is contemplated that the RPC 170 may include any number of sides and/or that one or more sides may be removable and/or collapsible. For example, one of sides 180 may be removable or collapsible from the RPC 170 in order to view or display the physical asset within the RPC 170.

In some embodiments, additional components may be integrated with the RPC 170. For example, the RPC 170 may include a beacon (not shown). The beacon may be as described with respect to FIG. 1A. However, although shown as being located in a particular position in FIG. 1A, it is contemplated that the beacon may be located in any suitable position on the RPC 170. For example, in some embodiments, the beacon may be located internal to the RPC 170 in order to track ventilation, cooling, and/or temperature being experienced by the physical asset within the RPC 170.

Figure 2:
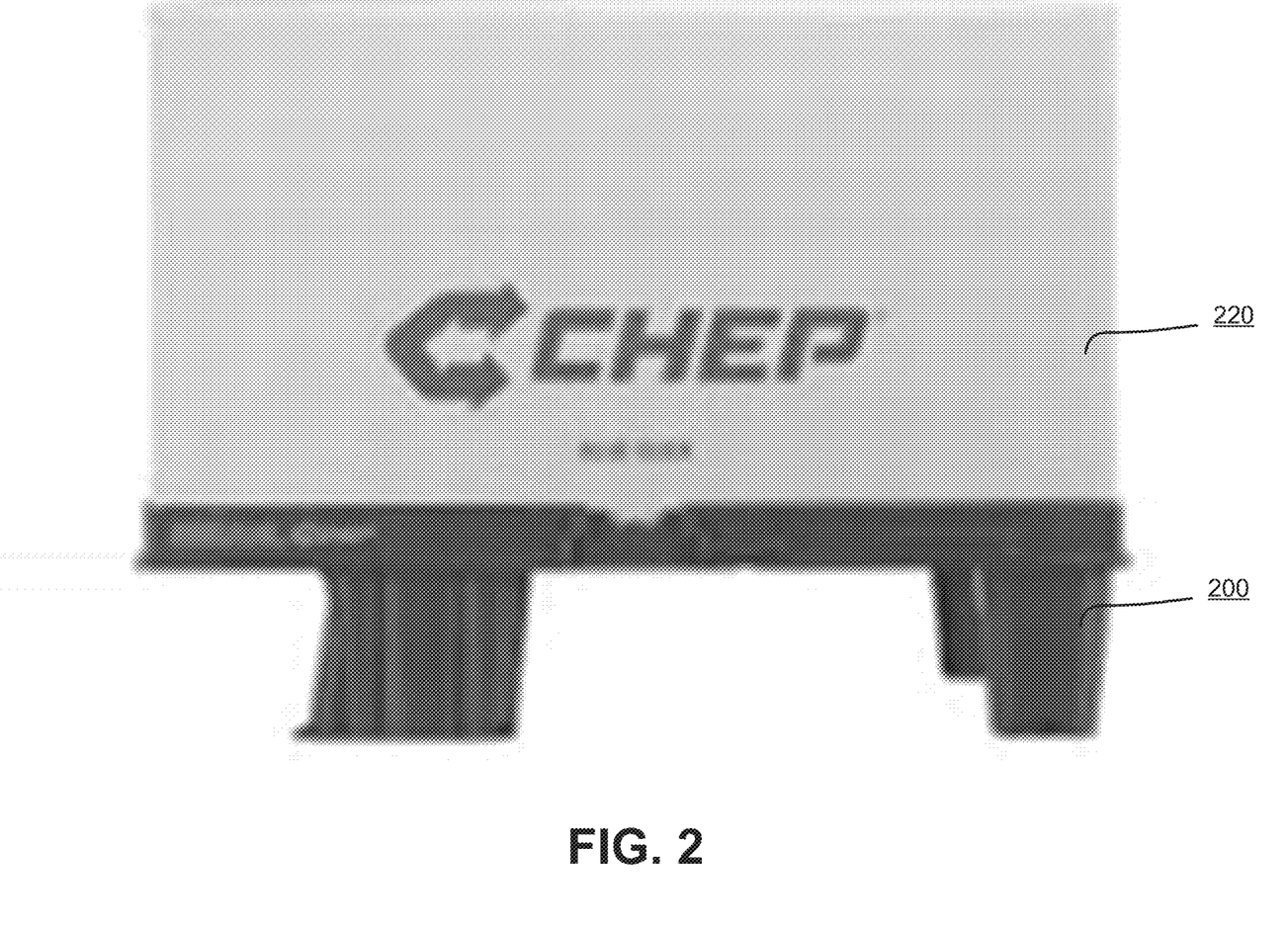
FIG. 2 is a side view of a pallet with a load, in accordance with some embodiments.

FIG. 2 is a side view of another exemplary pallet 200 with a load 220 placed atop the pallet 200 for transportation, storage, presentation, etc. The load 220 may be used herein interchangeably with the term "asset" or "assets". As used herein, pallet 100 may be referred to interchangeably with pallet 200.

Systems for Quality Monitoring of Assets

In some cases, it may be desirable to track a pallet. As used herein, "pallet tracking" may refer to the collecting and tracking of any data related to a pallet, such as a pallet's location in the supply chain and/or environmental or other conditions of the pallet. In some embodiments, this data may be relevant to quality monitoring of the asset being transported on the pallet. According to some embodiments of the invention, data may be collected by a plurality of pallets. The pallets may include a beacon and one or more sensors. In some embodiments, a pallet may include an RFID tag. In some embodiments, data collected by the pallets may be transmitted to an access device using a short range and/or low power communication protocol. The access device may be capable of both short range and long range communication. In some embodiments, data collected by the pallets may be transmitted directly to a remote server computer using a long range and/or higher power communication protocol.

Conventional tracking solutions only track and trace data related to the location of assets being transported on pallets. Currently, there is no systematic way to track and trace quality data relating to perishable (i.e., fresh) products across multiple segments in the supply chain. Thus, conventional systems have limited traceability and transparency with respect to the goods on top and the quality of assets. In addition, conventional systems are built for general merchandise of a variety of types. By not recognizing the unique challenges posed by perishable assets, higher waste and less freshness results.

Thus, according to some embodiments of the invention, pallets (e.g., via sensors and/or beacons) may provide goods visibility and quality monitoring on an ongoing basis at a particular frequency, as needed, or whenever the data reaches a particular threshold. This allows for the gathering of quality information throughout the supply chain (i.e., from farm to consumer) that can be shared with various entities across the supply chain, increasing interaction, transparency, and communication. The quality data may be used dynamically and in real time to implement changes with respect to the asset, such as the temperature the asset is being stored at, the humidity of the surrounding environment, the light at the surrounding environment, the route of the asset, the destination of the asset, the price of the asset, the length of the asset's journey, etc.

In addition, in some embodiments, quality monitoring data may be married with supply chain events. According to some embodiments, a product conveyance platform may be tracked through the supply chain. This data may be layered and associated with the quality monitoring data in order to draw inferences or conclusions about the product conveyance platform. For example, supply chain data supplied, by a beacon on a product conveyance platform, may be used to know where a product conveyance platform is located, what facility the product conveyance platform is at, etc. Once this supply chain data is known, it can be automatically paired with time stamped quality monitoring data. This may provide insight into various conditions, handling issues, and quality issues at various locations along the supply chain.

Figure 3:
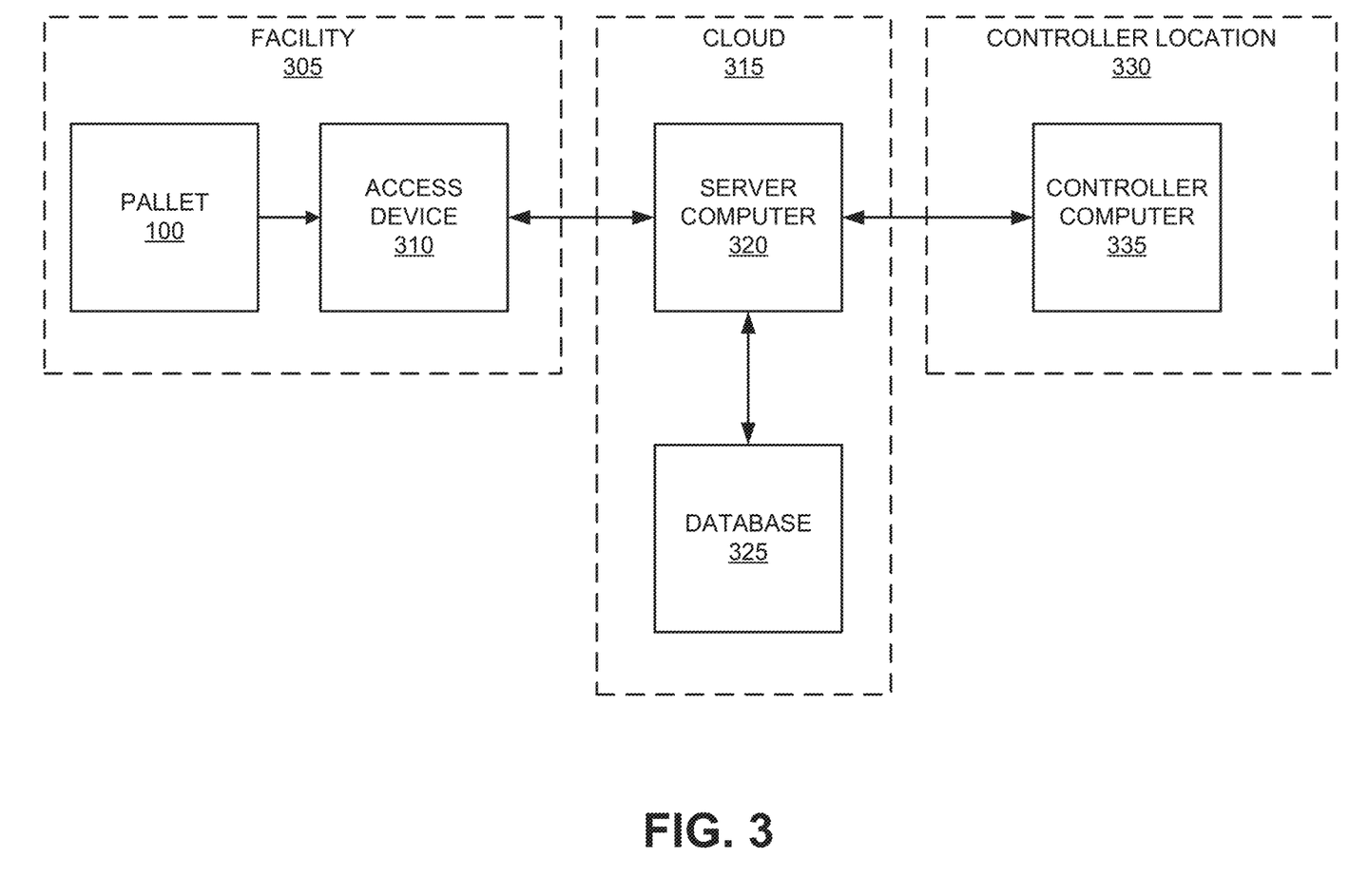
FIG. 3 is a block diagram illustrating a system for quality monitoring of assets, in accordance with some embodiments.

FIG. 3 is a block diagram illustrating a system for quality monitoring of assets, in accordance with some embodiments. The system may include a pallet 100, an optional access device 310, a server computer 320, a database 325, and a controller computer 335. The pallet 100 and the access device 310 may be located at a facility 305 in the supply chain, such as a warehouse or store. The server computer 320 and the database 325 may be located in the cloud 315, such as at one or more offsite of third party locations with online or networked storage. The controller computer 335 may be located at a controller location 330, such as at a pallet logistics and tracking company. Although shown and described with respect to a certain number of entities performing certain functions, it is contemplated that a greater or fewer number of entities may perform the functions described herein. For example, the functions of the server computer 320 may be spread across multiple server computers. In another example, the database 325 may be incorporated internally to the server computer 320.

In some embodiments, the pallet 100 may communicate data to the access device 310 via a beacon or other communication medium. The pallet 100 may be capable of communicating using particular communication protocols (e.g., short range or lower power communications protocols, such as Bluetooth, Bluetooth LE, WiFi, etc., and/or long range or higher power communication protocols, such as cellular communication, satellite communication, etc.). Receipt of the data may cause the access device 310 to perform one or more operations. For example, the access device 310 may aggregate the data received from the pallet 100 over a period of time, and transmit the aggregated data to a server computer 320. In some embodiments, the access device 310 may only communicate with the pallet 100 if the pallet 100 is a recognized or registered pallet. The pallet 100 may be capable of communicating with the access device 310 using one or more communication protocols common to both the pallet 100 and the access device 310 (e.g., short range or lower power communication protocols, such as Bluetooth, Bluetooth LE, WiFi, etc.). Thus, in some embodiments, only the access device 310 may be required to include more costly, longer range communication components; these components may be omitted from the pallet 100. In some embodiments, however, the pallet 100 may also be capable of communicating with the access device 310 and/or the server computer 320 using other communication protocols (e.g., long range or higher power communication protocols, such as cellular, GSM, satellite, etc.). In other words, in some examples, the pallet 100 may transmit the data directly to the server computer 320, and the access device 310 may be omitted.

Although shown and described as one pallet 100 being in communication with one access device 310, it is contemplated that any number of pallets 100 may be in communication with any number of access devices 310. For example, the ratio of pallets 100 to access devices 310 may be many to one, such as ten to one. In some embodiments, the number of pallets 100 with which the access device 310 is in communication may depend upon the number of pallets 100 within communication range of the access device 310. For example, one access device 310 may be in communication with five pallets 100, while another access device 310 at the facility 305 may be in communication with twenty pallets 100.

The optional access device 310 may be any suitable electronic user device. The access device 310 may include a communication device. A communication device may provide remote communication capabilities to a network. Examples of remote communication capabilities include using a mobile phone (wireless) network, wireless data network (e.g., 3G, 4G or similar networks), WiFi, Wi-Max, or any other communication medium that may provide access to a network such as the Internet or a private network.

Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 310 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 310 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like. The access device 310 may be mobile or may have a fixed location with respect to the facility 305.

The access device 310 may be in communication with the server computer 320. The access device 310 may forward aggregated quality data collected by the pallet 100 to the server computer 320. The server computer 320 may store the quality data in a database 325. For example, each piece of quality data may be received with an associated pallet identifier. Each pallet identifier may have an entry in the database 325 with which the associated quality data may be stored. Other information associated with the pallet identifier may be stored in the database 325, such as the type of asset being transported by that pallet, the category of asset being transported by that pallet (e.g., perishable, nonperishable, refrigerated, frozen, produce, etc.), the destination of that pallet, the route of that pallet (e.g., historical and/or predicted), the travel time of that pallet, etc.

In other words, the server computer 320 may store the quality data in association with the identifier of the pallet 100 in the database 325. For example, the server computer 320 may retrieve the entry in the database 325 associated with the pallet identifier and write the quality data in the record. In some embodiments, the quality data may be written to the record along with a timestamp indicating the date and time that the pallet 100 collected and/or transmitted the quality data. Thus, the record corresponding to a particular pallet may include a plurality of quality data collected at a plurality of times.

In some embodiments, the server computer 320 may use this quality data in conjunction with other stored data to perform analytics and/or take actions with respect to a particular pallet 100. For example, the server computer 320 may determine whether the pallet 100 is being stored and/or transported at the correct temperature based on the type of asset being transported by the pallet 100. If the pallet 100 is not being properly stored and/or transported, the server computer 320 may perform analytics on the quality data, e.g., determine how long the pallet 100 has been subjected to an incorrect temperature, adjust the shelf life of the asset, determine whether the asset has been spoiled, etc. The server computer 320 may further take corrective actions. Exemplary corrective actions include facilitating adjustment of the temperature (e.g., by sending a control signal to the refrigerated shipping container), rerouting the pallet 100 (e.g., to a discount store instead of a high end produce market, to a closer store to maximize shelf life of the asset, etc.), discarding the asset, etc. The server computer 320 may further generate records in the database 325 with these analytics and/or corrective actions. The device record values may be used more intelligently and frugally (in terms of power, memory, and bandwidth) by recording the sensor values when these approach the thresholds at a higher frequency than when the sensor readings are in the center of the upper and lower bounds. In some embodiments, some or all of the functions of the server computer 320 may alternatively or additionally be performed by another entity or system, such as the access device 310 and/or the controller computer 335.

In some embodiments, the server computer 320 may provide these records of individual pallet 100 analytics and/or corrective actions from the database 325 to a controller computer 335. The controller computer 335 may be an entity that tracks, maintains, and/or owns the pallet 100. The controller computer 335 may use these records to perform aggregate analytics. For example, the controller computer 335 may determine an overall percentage of pallets 100 associated with a particular carrier that are on time, at the correct facility, have acceptable quality data, etc. The controller computer 335 may further compute supply chain visibility metrics. In some embodiments, supply chain visibility metrics may include inventory at a given facility or in a given region, dwell time, and velocity metrics between regions or between facilities in the supply chain.

Figure 4:
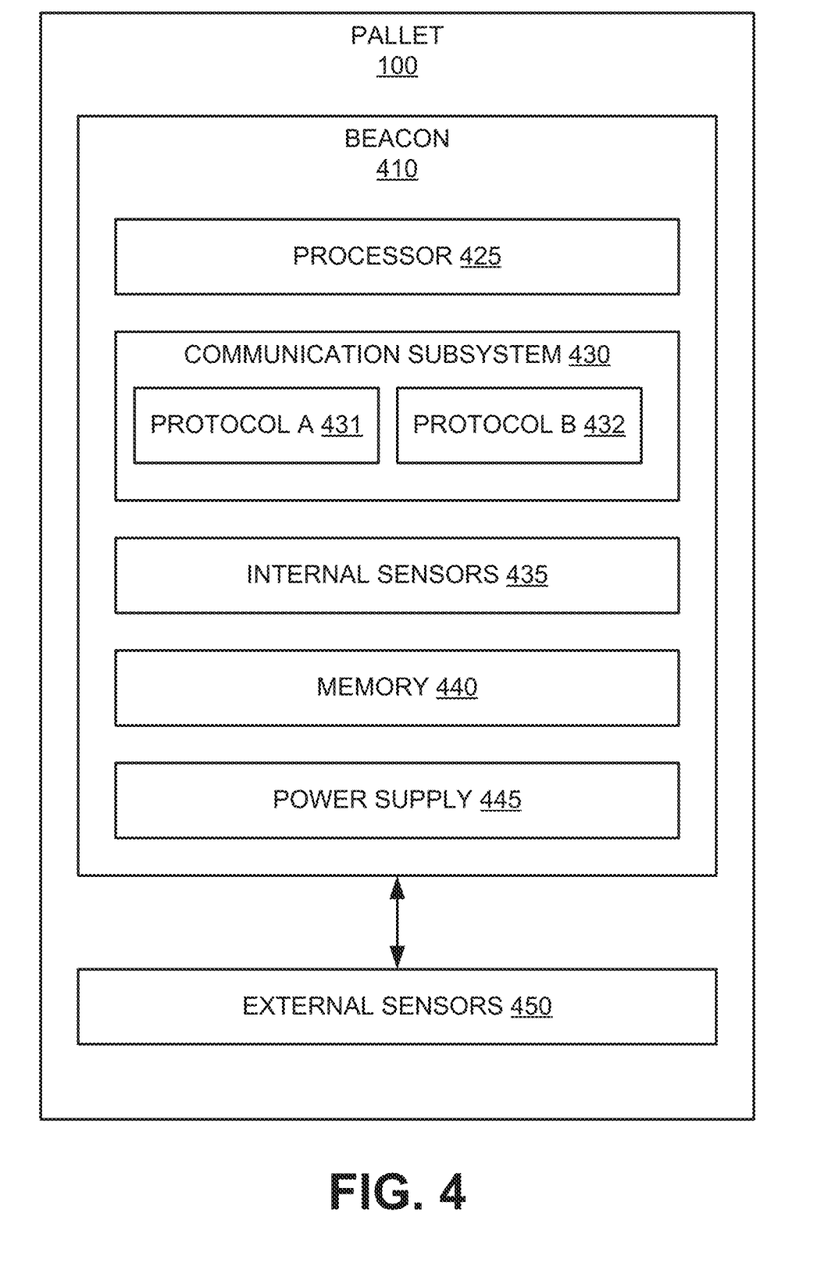
FIG. 4 is a block diagram illustrating the system components of a pallet, in accordance with some embodiments.

The pallet 100 may include components for performing multiple functions, as described herein. FIG. 4 is a block diagram illustrating the system components of a pallet 100. The pallet 100 may include a beacon 410 in operative communication with one or more external sensors 450. The beacon 410 may be implemented as the beacon 150, in some embodiments. The beacon 410 may include device hardware coupled to a memory 440. The device hardware may include a processor 425, a communication subsystem 430, internal sensors 435, and a power supply 445. In some embodiments, the beacon 410 may be implemented as an active tag (e.g., an RFID tag). The beacon 410 may be associated with an identifier (e.g., an active tag identifier, a beacon identifier, a pallet identifier, an asset identifier, etc.).

The processor 425 may be implemented as one or more integrated circuits (e.g., one or more single core or multicore microprocessors and/or microcontrollers), and may be used to control the operation of the beacon 410. The processor 425 can execute a variety of programs in response to program code or computer-readable code stored in memory 440, and can maintain multiple concurrently executing programs or processes. The communication subsystem 430 may include one or more transceivers and/or connectors that can be used by the beacon 410 to communicate with other devices (e.g., the external sensors 450, beacons, access devices, server computers, etc.) and/or to connect with external networks. In some embodiments, the communication subsystem 430 may be configured to communicate using more than one protocol (e.g., protocol A 431 and protocol B 432). Protocol A 431 and protocol B 432 may be two different wired or wireless communication protocols. For example, protocol A 431 and protocol B 432 may be selected from the group including Bluetooth, Bluetooth LE, near field communication, WiFi, cellular communication, Ethernet, fiber optics, etc. In some embodiments, protocol A 431 and protocol B 432 may both be short range, lower power and/or lower cost communication protocols. The particular protocol used for a particular communication may be determined based on any of a number of factors, including availability, signal strength, type and/or amount of power received from or remaining on power supply 445, power needed to communicate on a particular protocol, cost associated with using a particular protocol, data throughput, type of data to be communicated, size of data to be communicated, availability of an access device to forward the data remotely, and/or the like.

The internal sensors 435 may include any movement-related, location-related, and/or environmental-related sensors that may reflect tracking and/or quality monitoring of an asset on the pallet 100. For example, the internal sensors 435 may include a global positioning system (GPS), an accelerometer, a gyroscope, a barometer, a thermometer, a humidity sensor, a light sensor, a microphone, combinations thereof, and/or the like. The internal sensors 435 may measure, for example, position, time, orientation, vibration, location, velocity, acceleration, distance, rotation, altitude, temperature, humidity, pressure, sound, light, capacitance, inductance, resistance, voltage, chemical presence, combinations thereof, and/or the like. As used herein, "quality data" may refer to any type of data collected by any of the sensors described herein. The internal sensors 435 may be coupled to the communication subsystem 430, such that sensor measurements may be transmitted off of the pallet 100 to other devices or systems, as described further herein.

The memory 440 may be implemented using any combination of any number of non-volatile memories (e.g., flash memory) and volatile memories (e.g., DRAM, SRAM), or any other non-transitory storage medium, or a combination thereof media. In some embodiments, the memory 440 may be included in the processor 425. The power supply 445 may include any wired or wireless power supply, such as a power outlet supply, a solar panel, and/or a battery.

The beacon 410 may be coupled to one or more external sensors 450 on the pallet 100 in some embodiments. The external sensors 450 may include, for example, a weight sensor and/or any of the sensors described above with respect to the internal sensors 435. In one example, the weight sensor may include circuitry that measures the weight of a load on the pallet 100. The weight sensor may transmit the weight to the beacon 410. The beacon 410 may use the communication subsystem 430 to transmit this data off of the pallet 100 to other devices or systems, as described further herein.

In some embodiments, multiple pallets may include different hardware and/or software with respect to each other and with respect to the pallet 100 shown in FIG. 4. For example, one pallet may include only basic or no sensors (e.g., for nonperishable goods); another pallet may include mid-range sensors (e.g., for perishable goods); and another pallet may include a full range of sensors (e.g., for auditing purposes). This allows for cost savings depending on the type of asset being transported and the amount of relevant information needed to make corrective action decisions, as a higher number of sensors results in higher costs.

Figure 5:
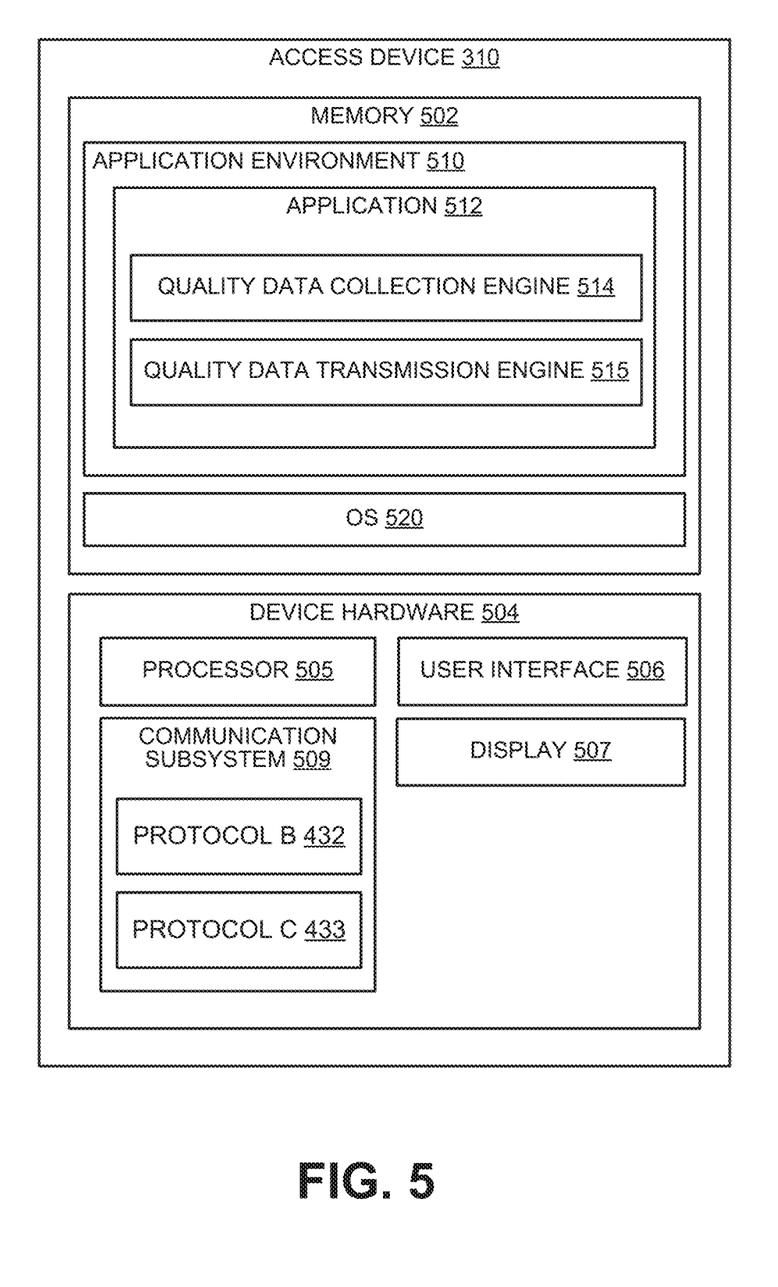
FIG. 5 is a block diagram illustrating an access device, in accordance with some embodiments.

FIG. 5 is a block diagram illustrating an optional access device 310, in accordance with some embodiments. The access device 310 may include device hardware 504 coupled to a memory 502. Device hardware 504 may include a processor 505, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 310. Processor 505 can execute a variety of programs in response to program code or computer-readable code stored in memory 502, and can maintain multiple concurrently executing programs or processes. User interface 506 can include any combination of input and output elements to allow a user to interact with and invoke the functionalities of the access device 310. In some embodiments, user interface 506 may include a component such as display 507 that can be used for both input and output functions. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that processes quality data received from a pallet and transmits it to a server computer via a communication protocol. In some embodiments, the communication protocol used by the access device 310 may not be available to the pallet (e.g., wired Ethernet communications). Application 512 may include a quality data collection engine 514 and a quality data transmission engine 515. In some embodiments, one or more of these components can be provided by another application or component that is not part of application 512.

The quality data collection engine 514 may be configured to, in conjunction with the processor 505 and the communication subsystem 509, receive quality data from a pallet. The quality data transmission engine 515 may be configured to, in conjunction with the processor 505 and the communication subsystem 509, transmit the quality data to a server computer. In some embodiments, the quality data collection engine 514 may receive tracking data at a first frequency, and the quality data transmission engine 515 may transmit tracking data at a second frequency. For example, the quality data collection engine 514 may receive quality data from a pallet once every ten seconds, while the quality data transmission engine 515 may transmit quality data once every two minutes. This may allow the access device 310 to collect and aggregate quality data from a pallet before transmitting the tracking data to a server computer. In some embodiments, the quality data transmission engine 515 may only transmit quality data when the quality data exceeds a threshold (e.g., the temperature is 15 degrees higher than the maximum acceptable temperature for an asset on the pallet), conserving power and/or communications costs.

Communication subsystem 509 may include one or more transceivers and/or connectors that can be used by access device 310 to communicate with other devices (e.g., the pallet) and/or to connect with external networks (e.g., to connect to the server computer 320). The communication subsystem 509 may be configured to communicate according to protocol B 432 and/or protocol C 433. In some embodiments, protocol B 432 may be a shorter range, lower power, and/or lower cost communication protocol that may be used to communicate with pallets, while protocol C 433 may be longer range, higher power, and/or higher cost communication protocol that may be used to communicate with server computers and/or other remote components or entities. Protocol B 432 and protocol C 433 may be selected from the group including Bluetooth, Bluetooth LE, near field communication, WiFi, cellular communication, Ethernet, fiber optics, satellite, etc. The particular protocol used for a particular communication and/or the transmission frequency of the quality data transmission engine 515 may be determined based on any of a number of factors, including availability of a particular protocol, signal strength, type and/or amount of power received from or remaining on a power supply, power needed to communicate on a particular protocol, cost associated with using a particular protocol, data throughput, type of data to be communicated, size of data to be communicated, and the like.

Figure 6:
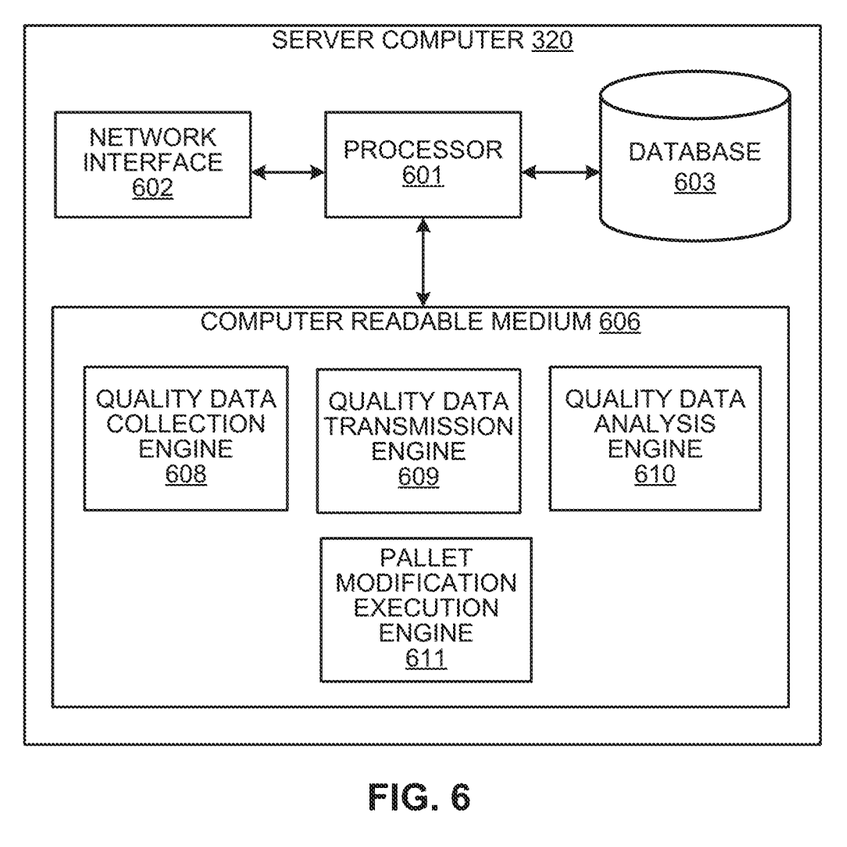
FIG. 6 is a block diagram illustrating a server computer, in accordance with some embodiments.

FIG. 6 is a block diagram illustrating a server computer 320, in accordance with some embodiments. Server computer 320 may include a processor 601 coupled to a network interface 602 and a computer readable medium 606. Server computer 320 may also include or otherwise have access to a database 603 that may be internal or external to the server computer 320.

Processor 601 may include one or more microprocessors to execute program components for performing the quality monitoring functions of the server computer 320. Network interface 602 may be configured to connect to one or more communication networks to allow the server computer 320 to communicate with other entities, such as the access device, the controller computer, pallets, etc. The network interface 602 may be configured to communicate according to protocol C 433 in some embodiments. In some embodiments, protocol C 433 may be a longer range, higher power, and/or higher cost communication protocol that may be used to communicate with access devices, controller computers, and/or the like.

Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the quality monitoring functions of server computer 320. For example, computer readable medium 606 may include code implementing a quality data collection engine 608, a quality data transmission engine 609, a quality data analysis engine 610, and a pallet modification execution engine 611. In some embodiments, the quality data analysis engine 610 and/or the pallet modification execution engine 611 may be optional and may instead be implemented by a controller computer.

The quality data collection engine 608 may be configured to, in conjunction with the processor 601 and the network interface 602, receive quality data associated with a pallet from the pallet and/or an access device in communication with the pallet. The quality data transmission engine 609 may be configured to, in conjunction with the processor 601 and the network interface 602, transmit the quality data to a controller computer. In some embodiments, the quality data collection engine 608 may receive quality data at a first frequency, and the quality data transmission engine 609 may transmit tracking data at a second frequency. For example, the quality data collection engine 608 may receive tracking data once a minute, while the quality data transmission engine 609 may transmit tracking data once every five minutes. This may allow the server computer 320 to collect and aggregate quality data relating to a pallet over a period of time before transmitting the quality data to a controller computer. In some embodiments, the server computer 320 may alternatively or additionally transmit quality data analysis and/or pallet modifications to the controller computer, as described further herein.

In some embodiments, the server computer 320 may include a quality data analysis engine 610. The quality data analysis engine 610 may be configured to, in conjunction with the processor 601, use the quality data to perform analytics. For example, the quality data analysis engine 610 may determine whether a pallet is in a proper ambient temperature, has experienced any major impacts or vibrations, has gotten wet, has been subjected to high humidity, etc. The quality data analysis engine 610 may make this determination by comparing quality data measurements taken by sensors associated with the pallet to thresholds set for the particular type of asset being transported on the pallet.

For example, the quality data analysis engine 610 may receive quality data associated with a pallet identifier. The quality data analysis engine 610 may retrieve asset data associated with that pallet identifier from the database 603. The quality data analysis engine 610 may further retrieve thresholds associated with that asset data from the database 603. The quality data analysis engine 610 may then compare the quality data to the thresholds to determine whether any of the quality data has exceeded a corresponding threshold. In some embodiments, the quality data analysis engine 610 may further determine whether any of the quality data has exceeded a corresponding threshold for a given amount of time (e.g., a temperature spike above the threshold for one minute may be disregarded, while a steady temperature above the threshold for thirty minutes may be noted), also referred to herein as an "incident". An incident may occur if a sensor threshold is breached. Any quality data exceeding the threshold ("outlier data") may be recorded by the quality data analysis engine 610 in the database 603, transmitted to a controller computer, and/or transmitted to the pallet modification execution engine 611. In some embodiments, an alert may be generated. An alert may occur based on additional rules for incidents for example, an incident laster for more than a given duration (e.g., humidity) or more than a number of times (e.g., impact) or by more than a certain amount (e.g., temperature), or any combination thereof.

In some embodiments, the server computer 320 may include a pallet modification execution engine 611. The pallet modification execution engine 611 may be configured to, in conjunction with the processor 601, receive outlier data from the quality data analysis engine 610. The pallet modification execution engine 611 may further take one or more corrective actions based on the outlier data. For example, the pallet modification execution engine 611 may determine that a pallet of glassware has been subject to high impacts and/or vibrations. Thus, the pallet modification execution engine 611 may transmit an alert to a carrier, a controller computer, and/or the like to visually inspect the glassware. In another example, the pallet modification execution engine 611 may determine that a pallet of produce has been subject to high temperatures for thirty minutes. The pallet modification execution engine 611 may transmit a control signal or alert to the warehouse housing the pallet to lower its temperature. In still another example, the pallet modification execution engine 611 may determine that a pallet of bread has been exposed to excessively high humidity for one day. The pallet modification execution engine 611 may reroute the pallet to a closer location of the destination market, or to a discount or lower cost market that carries goods with shorter shelf lives and/or of lower quality.

Methods for Quality Monitoring of Assets

Figure 7:
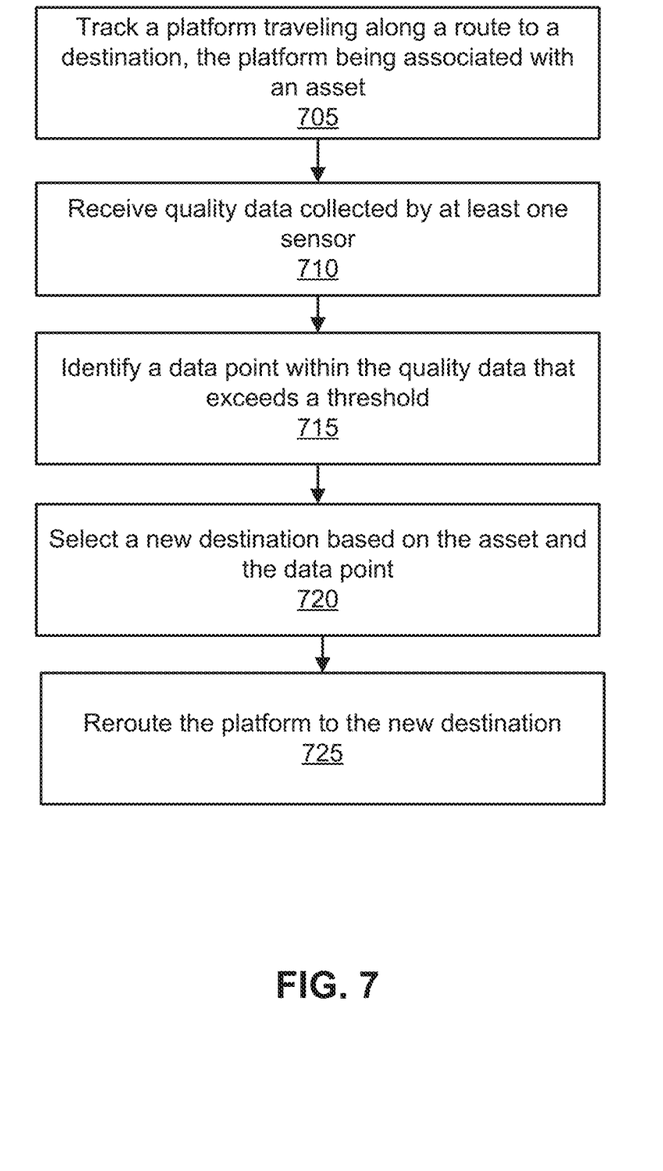
FIG. 7 is a flow chart illustrating a method for quality monitoring of assets, in accordance with some embodiments.

A variety of methods may be implemented by the above-described systems. FIG. 7 is a flow chart illustrating a method for quality monitoring of assets, in accordance with some embodiments. According to the process of FIG. 7, a corrective action of rerouting is taken based on the quality data. However, it is contemplated that any of the corrective actions described herein may be implemented based on the quality data, and thus, FIG. 7 is not intended to be limiting. For example, instead of rerouting the asset, a selling price for the asset may be lowered.

At process block 705, a platform traveling along a route to a destination is tracked. The platform may be associated with an asset. As used here, a "platform" may be used interchangeably with a "pallet", as defined further herein. An "asset" may refer to any physical goods being transported with, stored with, or otherwise associated with a pallet. The platform may be tracked from end-to-end, e.g., from the grower or manufacturer to the store or consumer.

At process block 710, quality data collected by at least one sensor affixed to the platform is received. The quality data may include any data that may be used to determine a characteristic of the asset, such as location data, environmental data, product data, etc. In some embodiments, the quality data may be collected by sensors associated with the platform. Exemplary types of quality data include an origin location, a destination location, a current location, a temperature, a humidity, a pressure, an amount of vibration, an amount of impact, an amount of sound, an amount of light, an amount of movement, an amount of rotation, an amount of acceleration, combinations thereof, and/or the like. In some embodiments, the quality data is received in real time. In some embodiments, only quality data exceeding a threshold is received in real time. In some embodiments, quality data is received at predetermined intervals (e.g., every 2 minutes). These intervals may be less often than quality data is collected by the at least one sensor affixed to the platform. The quality data may be collected at any and/or all points across the supply chain, from the time that it is picked up at the grower or manufacturer, to the time that it is delivered to a store.

At process block 715, a data point within the quality data is identified that exceeds a threshold. The threshold may be specific to the asset (e.g., an asset of one type may have a different threshold than an asset of another type). For example, if the asset is ice, the temperature threshold may be 32 degrees Fahrenheit. However, if the asset is electronics, the temperature threshold may be 100 degrees Fahrenheit. In the latter example, if the ambient temperature measured by a sensor associated with the platform transporting the electronics is measured at 105 degrees Fahrenheit at a particular point in time, that data point may be identified and recorded. In some embodiments, the data point is only identified and recorded if the threshold is exceeded for a number of consecutive or aggregated measurements. For example, a single 105 degree measurement over a span of an hour may not be identified and recorded, while ten consecutive 105 degree measurements over a span of an hour may be identified and recorded. Similarly, ten nonconsecutive 105 degree measurements over the span of an hour may be identified and recorded, as it may be assumed that measurements at or above the threshold will continue.

At process block 720, a new destination is selected based on the asset and the data point. In another example, a data point of a 115 degree temperature may be recorded for a platform transporting bananas, wherein the bananas have a threshold temperature of 75 degrees. The original destination of the bananas may have been a high end, high quality organic food market. However, given that the bananas were subject to temperatures well outside their acceptable range (in some embodiments, for a period of time that may be also tracked), the bananas may develop an undesirable brown color and tray only have a shelf life of 2 days. Thus, the platform carrying the bananas may be rerouted to a discount food market that sells lower price, lower quality food items. In another example, the bananas may be discarded. Additionally or alternatively, a new platform of bananas may be immediately dispatched and expedited to the organic food market. At process block 725, the platform is rerouted to the new destination.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable, data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A computer-implemented method comprising:
   tracking, by a server computer, locations of a plurality of pallets, wherein:
      the plurality pallets are associated with a plurality of assets packaged on the plurality of pallets;
      each of the pallets comprises an electronic beacon integrated with the pallet, wherein each of the electronic beacons comprise:
         a processor and a memory storing a pallet identifier; and
         one or more sensors configured to measure one or more environmental conditions experienced by the corresponding asset;
   receiving, by the server computer, quality data collected by one or more access devices, wherein:
      the quality data comprises measurements of the one or more environmental conditions from the one or more sensors from the electronic beacons in the plurality of pallets; and
      the one or more access devices collect the quality data from the plurality of pallets and transmit the quality data to the server computer;
   for a pallet in the plurality of pallets:
      identifying an existing destination that was based on a first predicted shelf life of the corresponding asset;
      identifying a threshold based at least in part on:
         a type of the quality data; and
         a type of the corresponding asset;
      identifying a data point within the quality data that exceeds the threshold;
      calculating a second predicted shelf life of the corresponding asset based on a length of time for which the data point within the quality data exceeded the threshold;
      selecting a new destination based on at least in part on the second predicted shelf life; and
      causing the first pallet to be rerouted to the new destination.

2. The computer-implemented method of claim 1, wherein the quality data is received at the server computer as the plurality of pallets pass across multiple segments of a supply chain.

3. The computer-implemented method of claim 1, further comprising:
   receiving one or more supply chain events; and
   combining the one or more supply chain events with the quality data to identify the threshold.

4. The computer-implemented method of claim 1, further comprising:
   receiving a pallet identifier for the first pallet;
   accessing an entry in a database using the pallet identifier, wherein the entry in the database comprises the type of the asset.

5. The computer-implemented method of claim 4, wherein:
   the entry in the database further comprises a category of the corresponding asset; and
   identifying the threshold is also based at least in part on the category of the asset.

6. The computer-implemented method of claim 5, wherein the category of the asset comprises perishable or nonperishable.

7. The computer-implemented method of claim 1, further comprising determining a length of time for which the data point within the quality data exceeds the threshold.

8. The computer-implemented method of claim 7, further comprising determining whether the corresponding asset has been spoiled based on the length of time for which the data point within the quality data exceeds the threshold.

9. The computer-implemented method of claim 1, wherein the new destination is selected such that the new destination is closer than a previous destination to maximize a shelf life of the asset.

10. The computer-implemented method of claim 1, wherein the new destination comprises a discount location.

11. The computer-implemented method of claim 1, further comprising:
    determining whether a second data point within the quality data is approaching the threshold; and
    causing sensor values at the electronic beacon of the first pallet to be recorded at a higher frequency in response to the second data point approaching the threshold.

12. The computer-implemented method of claim 1, further comprising calculating an overall characterization having acceptable quality data.

13. The computer-implemented method of claim 1, further comprising determining types of sensors providing data points in the quality data that should be compared to thresholds based on the type of the asset.

14. The computer-implemented method of claim 1, further comprising:
    determining a number of times within a predetermined time interval that the data point exceeds the threshold; and
    recording an incident if the number of times exceeds a second threshold.

15. The computer-implemented method of claim 1, wherein the quality data comprises:
   an origin location;
   a destination location; and
   a current location.

16. The computer-implemented method of claim 1, wherein the quality data is received only after the pallet determines that the data point has exceeded the threshold.

17. The computer-implemented method of claim 1, wherein the one or more access devices receive the quality data from the electronic beacons of the plurality of pallets using a first communication protocol, and the one or more access devices transmit the quality data to the server computer using a second communication protocol.

18. The computer-implemented method of claim 1, wherein the quality data received from the one or more access devices are aggregated at the one or more access devices over a period of time and received by the server computer as a batch transmission.

19. A computer-program product tangibly embodied in a non-transitory machine-readable storage medium of a server computer, including instructions that, when executed by one or more processors, cause the one or more processors to perform operations comprising:
   tracking, by a server computer, locations of a plurality of pallets, wherein:
      the plurality pallets are associated with a plurality of assets packaged on the plurality of pallets;
      each of the pallets comprises an electronic beacon integrated with the pallet, wherein each of the electronic beacons comprise:
         a processor and a memory storing a pallet identifier; and
         one or more sensors configured to measure one or more environmental conditions experienced by the corresponding asset;
   receiving, by the server computer, quality data collected by one or more access devices, wherein:
      the quality data comprises measurements of the one or more environmental conditions from the one or more sensors from the electronic beacons in the plurality of pallets; and
      the one or more access devices collect the quality data from the plurality of pallets and transmit the quality data to the server computer;
   for a pallet in the plurality of pallets:
      identifying an existing destination that was based on a first predicted shelf life of the corresponding asset;
      identifying a threshold based at least in part on:
         a type of the quality data; and
         a type of the corresponding asset;
      identifying a data point within the quality data that exceeds the threshold;
      calculating a second predicted shelf life of the corresponding asset based on a length of time for which the data point within the quality data exceeded the threshold;
      selecting a new destination based on at least in part on the second predicted shelf life; and
      causing the pallet to be rerouted to the new destination.

20. A server computer comprising:
   a processor; and
   a memory coupled to the processor, the memory storing instructions which when executed by the processor, cause the server computer to perform operations including:
   tracking, by a server computer, locations of a plurality of pallets, wherein:
      the plurality pallets are associated with a plurality of assets packaged on the plurality of pallets;
      each of the pallets comprises an electronic beacon integrated with the pallet, wherein each of the electronic beacons comprise:
         a processor and a memory storing a pallet identifier; and
         one or more sensors configured to measure one or more environmental conditions experienced by the corresponding asset;
   receiving, by the server computer, quality data collected by one or more access devices, wherein:
      the quality data comprises measurements of the one or more environmental conditions from the one or more sensors from the electronic beacons in the plurality of pallets; and
      the one or more access devices collect the quality data from the plurality of pallets and transmit the quality data to the server computer;
   for a pallet in the plurality of pallets:
      identifying an existing destination that was based on a first predicted shelf life of the corresponding asset;
      identifying a threshold based at least in part on:
         a type of the quality data; and
         a type of the corresponding asset;
      identifying a data point within the quality data that exceeds the threshold;
      calculating a second predicted shelf life of the corresponding asset based on a length of time for which the data point within the quality data exceeded the threshold:
      selecting a new destination based on at least in part on the second predicted shelf life; and
      causing the pallet to be rerouted to the new destination.

* * * * *